Oct. 26, 1948.     J. L. SNOEK     2,452,530
MAGNETIC CORE
Filed Sept. 19, 1945
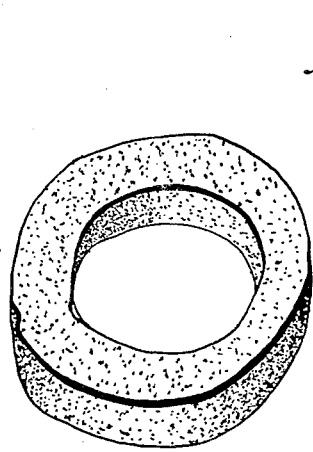
Fig. 4
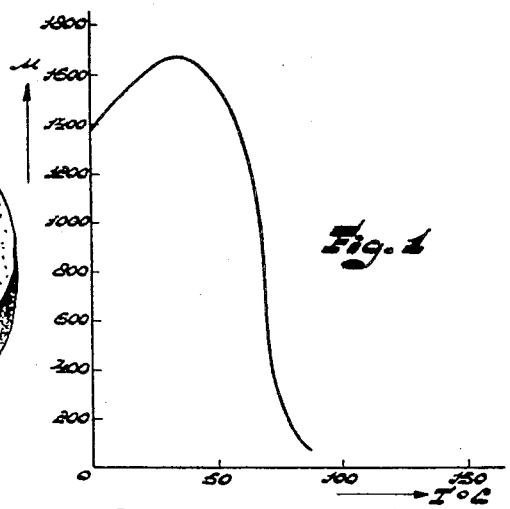
Fig. 1
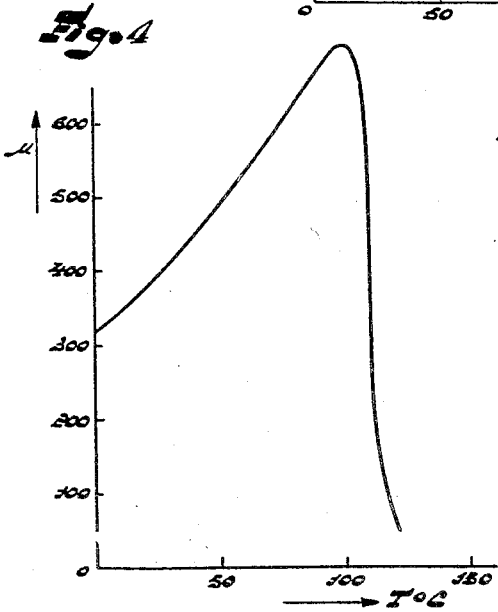
Fig. 2
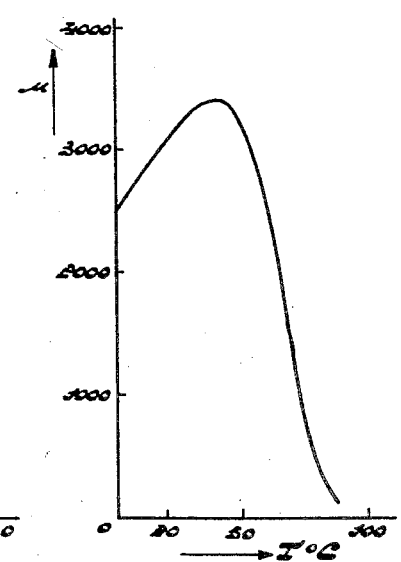
Fig. 3
INVENTOR
JACOB LOUIS SNOEK
BY 
ATTORNEY Patented Oct. 26, 1948

2,452,530

UNITED STATES PATENT OFFICE 2,452,530

MAGNETIC CORE

Jacob Louis Snoek, Eindhoven, Netherlands, assignor to Hartford National Bank & Trust Co., Hartford, Conn., as trustee Application September 19, 1945, Serial No. 617,392
In the Netherlands May 15, 1943

Section 1, Public Law 690, August 8, 1946
Patent expires May 15, 1963

19 Claims. (Cl. 252—62.5)

The invention relates to a magnetic core whose magnetic material is formed by a cubic ferrite and to the manufacture of such a core and it has for its object to produce a magnetic ferrite having an initial permeability of high value.

According to the invention, the magnetic material for use in a magnetic core is constituted by a cubic ferrite whose Curie-point lies between 40° and 250° C. According to the invention, by ensuring that the ferrite has not only a suitable Curie-point but also a sufficient homogeneity it is possible to obtain magnetic cores which have a ring permeability of 600 and upwards.

For the elucidation of the invention it may be mentioned that in experiments which preceded the realization of the invention, it has been found that the initial permeability of a ferrite attains its maximum value immediately below the Curie-point and that the initial permeability varies with temperature in such manner that when the temperature decreases from the Curie-point the permeability at first increases rapidly and then, upon a further decrease of temperature, decreases in value, relatively gradually.

According to the invention, by utilizing a ferrite having a suitable Curie-point, comparatively favorable initial magnetic permeability values may be realized in the temperature range which coincides approximately with the temperature range wherein the magnetic core is to be used in practice. By thus adapting the Curie-point of the ferrite to the operating temperature of the magnetic core it is possible to obtain optimum values for the initial permeability. Since the operating temperature is usually located at room temperature or in the neighbourhood thereof, use is made, according to the invention, of a ferrite of such composition that its Curie-point lies between 40° and 250° C. By "Curie-point" is meant hereinafter the temperature at which the initial permeability has fallen to a slight fraction of approximately 10% of the maximum value, or in other words the temperature at which the magnetic material passes into a state which, for practical purposes, may be considered as non-magnetic. It should be noted that in some cases, of which one example will be given hereinafter, the Curie-point thus defined may differ from the temperature at which the magnetic saturation disappears.

For the further explanation of the invention it may be mentioned that in realizing the invention it has also been found that, in order to obtain a high value for the initial permeability, it is desirable not only to make provisions for a suitable Curie-point but also to ensure that the finally obtained ferrite approaches as closely as possible the state of a single homogeneous phase, i. e. provision must be made to ensure a satisfactory reaction of the mixture which forms the starting-point in the production of the ferrite, whilst, furthermore, as far as possible upon cooling down the once formed and thoroughly reacted ferrite, disengaging of a second phase should be avoided. The latter may be the case if upon cooling down the ferrite disengages any of its constituent oxides, which, at a high temperature, is maintained, as it were, in oversaturated solid solution or if the ferrite, upon cooling down, has a tendency of being split up into its constituent oxides.

For obtaining a high initial permeability it is also highly important to utilize raw materials of great purity.

After that which has been set out hereinbefore the following may be mentioned about the manufacture of a magnetic core according to the invention.

A cubic ferrite having a Curie-point lying between 40° and 250° C. is preferably obtained by combining one or more cubic ferrites of low Curie-point, lower than 40° C., in suitable mixture proportions with one or more cubic ferrites of higher Curie-point, so that a mixed crystal of different ferrites is obtained. It has been found that the Curie-point of such a mixed crystal lies between the Curie-points of the single ferrites of which it may be imagined to be built up. It is also possible to act upon the Curie-point of a ferrite by regulating the iron oxide percentage of the latter.

According to the invention, very satisfactory results may be obtained if zinc ferrite, which has a low Curie-point, is combined with one or more cubic ferrites of higher Curie-point so as to produce a mixed zinc ferrite.

Mixed zinc ferrites with a Curie-point value lying between 40° and 250° C. cannot only be easily obtained but they also offer the further advantage of a great chemical stability, owing to which, upon cooling down, they will not easily disengage a troublesome second phase, which makes it easier to obtain a homogeneity favourable for the permeability. It is in general advisable to utilize a ferrite composition of the greatest possible stability in order to reduce as far as possible the tendency to the formation of a second phase.

A ferrite according to the invention may be prepared by compressing and subsequently by sintering an intimate mixture of the oxides of which the ferrite is built up or of a similar mixture of compounds which, when heated, are converted into oxides. Use is preferably made of a mixture of stoichiometrical composition, i. e. a mixture wherein the molecular percentage of iron oxide amounts to 50%. If, in view of the Curie-point, this should be desirable, it is also possible to utilize a percentage which differs therefrom. The sintered mixture may be finely ground and the pulverulent ferrite thus obtained may be worked up into a magnetic core. If desired, the starting mixture may also be pressed directly into a core of the desired shape and then be sintered.

If during the cooling following after the sintering operation, there exists the danger of a second phase being disengaged, this danger may be counteracted by cooling quickly, although a quick cooling, quicker than, for example, 10° C. per minute, should in general be avoided, since this may give rise to the production of so-called quenching stresses.

These quenching stresses make the material brittle (cf. the brittleness of quickly cooled glass) whilst, in addition, they have a harmful effect on the permeability. The optimum quickness of cooling can be easily determined experimentally for each individual case.

It should be observed that in those cases wherein the ferrite has reacted incompletely so that the ferrite phase produced is of non-homogeneous composition, the Curie-point as defined in the present patent specification usually differs from the temperature at which the magnetic saturation disappears.

Although the initial permeabilities which may be obtained according to the invention, are naturally different, inter alia, due to the fact that, upon cooling down, one ferrite disengages a second phase less easily than the other and consequently may be brought into a state which approaches more closely that of a single homogeneous ferrite phase, it has been found that by carrying out the invention it is frequently possible to obtain for the permeability values which are appreciably higher than the above-mentioned amount of 600, often considerably higher than 1000. Such materials are very suitable for use in transformers, choke coils and the like.

Very high values for the initial permeability may be obtained according to one embodiment of the invention wherein use is made of a ferrite containing nickel. It has been found that with a mixed nickel zinc ferrite it is possible to obtain for the initial permeability values of 3000 and upwards. By the term "nickel zinc ferrite" is meant a ferrite which substantially consists of nickel oxide, zinc oxide and ferric oxide.

In order to obtain the above-mentioned product which has reacted as completely as possible, it is advisable to start from a ferrite-forming starting mixture of great fineness and reactivity. In order to obtain a great fineness and reactivity the starting mixture may be ground during a long time and with great intensity. This grinding operation should preferably be continued until an average size of the particles of less than 1 $\mu$ is obtained.

A very favourable result may be obtained if the starting-point is formed by a mixture of oxydhydrates obtained by precipitating, by means of a base, a solution of the metals constituting the ferrite and by drying the precipitate obtained, part of which may have already the structure of ferrite, and then, for the purpose of improving the mouldability, by heating it to from 500 to 700° C.

According to another embodiment of the invention, in preparing a ferrite use is made of repeated sintering operations, i. e. that the sintered mixture is ground and sintered anew. This treatment may be repeated a few times, in which event the first sintering operations are carried out at a comparatively low temperature at which the mixture does not yet react completely. Now the product obtained can be easily ground once more to great fineness. Compression of the mixtures to be sintered at a low temperature is suppressed in this case in order to facilitate the grinding operation. This method of preparation offers the advantage that the starting mixture reacts satisfactorily and homogeneously, which is beneficial to the value of the initial permeability.

Reference is made to my copending U. S. application Serial No. 616,928, filed September 19, 1945, of which the present application is a continuation-in-part and my copending U. S. application Serial No. 617,393, filed September 19, 1945, a continuation-in-part of the said application.

With ferrites according to the present invention such a high percentage of oxygen may also be aimed at.

It should be noted in this connection that by carrying out a treatment with oxygen for the purpose of raising the percentage of oxygen of a ferrite there may occur a slight change in the situation of the Curie-point. Thus, for example, it has been observed that a nickel zinc ferrite which, after being formed by heatng a mixture of its constituent oxides, has gradually cooled down in the presence of oxygen, for example at a rate of from 5 to 10° C. per minute, has a higher Curie-point than a nickel zinc ferrite which, in order to raise its percentage of oxygen, has been cooled step by step in oxygen, that is to say has been maintained for a long time at the same temperature before it was cooled further down.

For the sake of completeness it may be observed that in the present patent specification the term "core" includes not only a core arranged within a coil but in general any parts of electro-magnetic constructions, which are utilized in view of their magnetic properties, for example also parts intended for magnetical screening.

In order that the invention may be more readily understood it will now be described with reference to the following examples and to the accompanying drawing in which:

Fig. 1 is a curve showing the relationship between the magnetic permeability of a core of material prepared in accordance with the following Example I and the temperature;

Fig. 2 is a curve showing the temperature and magnetic permeability relationship of a core of material prepared in accordance with the following Example II, Fig. 3 is a curve showing the temperature and magnetic permeability relationship of a core of material prepared in accordance with the following Example III; and Fig. 4 shows a ring core made in accordance with the invention.

*Examples*

I. A mixture of 20 mol. per cent of pure copper oxide, 30 mol. per cent of pure zinc oxide and 50 mol. per cent of pure (violet) iron oxide, to which is added 1% by weight of brownstone, is ground during half an hour in an iron ball mill. The mixture is pressed, under a pressure of 4 tons per sq. cm., into a ring having a diameter of 3 cms. and a cross-section of 4 to 4 mms. Then this ring is heated for 1 hour to 1100° C. in an oxygen current, whereupon it is cooled down to room temperature in the current of oxygen at a rate of from 5 to 10° C. per minute. The product obtained had an initial permeability of 118 measured at room temperature at a frequency of 2 kc./s. When heating instead of to 1100° C. to a higher temperature, we obtain higher values for the initial permeability. In the table below the values obtained for the initial permeability $\mu$ in dependence on the sintering temperature are mentioned in column 2.

If the oxide mixture which has been ground during half an hour is first heated to 900° C. for 2 hours in the presence of oxygen, is then cooled and subsequently ground for 2 hours in a disintegrator comprising iron balls and only then pressed into a ring which is sintered at 1100° C. or at a higher temperature, we obtain for the initial permeability values as mentioned in the third column of the table. If the oxide mixture, instead of being pre-sintered once, is pre-sintered two or three times at 900° C. (the mixture being ground in the intervals between these sintering operations) we obtain for the initial permeability the values mentioned in columns 4 and 5 respectively.

| sintering temperature U | $\mu$ | $\mu$ when pre-sintering once at 900°C. | $\mu$ when pre-sintering twice | $\mu$ when pre-sintering three times |
|---|---|---|---|---|
| 1100°C | 118 | 148 | 154 | 155 |
| 1150°C | 175 | 260 | 310 | 340 |
| 1200°C | 285 | 390 | 450 | 1,000 |
| 1250°C | 295 | 1,230 | 1,290 | 1,580 |

Fig. 1 shows for ferrite which has been pre-sintered three times and which finally has been sintered at 1250° C., which ferrite had at room temperature an initial permeability of 1580, how the initial permeability depends upon the temperature at which the measurement takes place. It may be seen from this curve that the Curie-point of a copper zinc ferrite of the described composition approximately amounts to 80° C. and, furthermore, that the permeability has the highest value at approximately 35° C. at which a value of 1670 is attained.

II. A mixture of 25½ mol. per cent of pure magnesia, 25½ mol. per cent of pure zinc oxide and 49 mol. per cent of pure (violet) iron oxide is ground during one day in an iron-ball mill, compressed into a ring in the manner described in Example I, heated in the presence of oxygen for 1 hour to 1400° C., and then slowly cooled down in oxygen. The permeability of the obtained product amounted to 670, measured at room temperature at a frequency of 2 kc./s., the Curie point of the ferrite being approximately 100° C. Fig. 2 shows how the initial permeability depends upon temperature.

III. A mixture of 15 mol. per cent of pure nickel oxide, 35 mol. percent of pure zinc oxide and 50 mol. percent of pure iron oxide, obtained by heating iron oxalate, is sintered during 2 hours at 950° C. in the presence of oxygen. After having cooled down, it is ground for 2 hours in a disintegrator comprising iron balls whereupon it is sintered anew at 950° C. and is ground. From the powder thus obtained is pressed in the manner described in Example I a ring which is sintered during 2 hours at 1300° C., in the presence of oxygen; then it is slowly cooled down in oxygen. The product obtained has an initial permeability of 3000, measured at room temperature at a frequency of 2 kc./s. Fig. 3 shows how the initial permeability depends upon temperature. The Curie-point of this nickel zinc ferrite approximately amounts to 80° C. If the nickel zinc ferrite produced in the above-described manner is heated during three full days to 950° C. in the presence of oxygen, we obtain an initial permeability of 800, the Curie-point being in this case about 60 C.

For the purpose of defining the terms "ferrite," "mixed crystal," and "soft" magnetic materials, the following definitions will be employed in connection with the above-noted terms as used throughout the specification and in the appended claims.

A "ferrite" is a crystalline material which is a compound of the reaction product of a metal oxide and iron oxide having the empirical formula $MFe_2O_4$ wherein M represents a bivalent metal. This material may also be defined as a metallic salt of the hypothetical acid $H_2Fe_2O_4$.

A "mixed crystal" ferrite is a ferrite material comprising two or more ferrites as hereinbefore defined which are chemically combined together to form a single homogeneous crystalline compound.

The term "soft" magnetic material means magnetic material having a low remanence and a low coercivity when the applied inductive field is removed from the material.

Within the scope of the definitions noted above, I have described my invention with specific examples and methods of execution, which, however, will suggest other obvious modifications to those skilled in the art without departing from the spirit and scope of my invention.

What I claim is:

1. A soft ferromagnetic core material having a high magnetic permeability and low magnetic losses consisting essentially of a cubic homogeneous mixed crystal ferrite constituted by a plurality of ferrites, said mixed crystal ferrite having a Curie point between about 40° and 250° C. and having an initial permeability of about 600.

2. A soft ferromagnetic core material consisting essentially of a cubic homogeneous mixed crystal ferrite constituted by a plurality of ferrites, said mixed crystal ferrite having a Curie point between about 40° and 250° C. and having an initial magnetic permeability greater than about 600.

3. A soft ferromagnetic core material consisting essentially of a cubic homogeneous mixed crystal ferrite constituted by a plurality of ferrites, said mixed crystal ferrite having a Curie point between about 40° and 250° C. and having an initial magnetic permeability greater than about 1000.

4. A soft ferromagnetic core material consisting essentially of a cubic homogeneous mixed crystal ferrite constituted by copper ferrite and zinc ferrite, said core material having a Curie point between about 40° and 250° C. and having an initial magnetic permeability greater than about 600.

5. A soft ferromagnetic core material consisting essentially of a cubic homogeneous mixed crystal ferrite constituted by magnesium ferrite, and zinc ferrite, said core material having a Curie point between about 40° and 250° C. and having an initial magnetic permeability greater than about 600.

6. A soft ferromagnetic core material consisting essentially of a cubic homogeneous mixed crystal ferrite constituted by nickel ferrite, and zinc ferrite, said core material having a Curie point between about 40° and 250° C. and having an initial magnetic permeability greater than about 600.

7. A soft ferromagnetic core material consisting essentially of a cubic homogeneous mixed crystal ferrite constituted by copper ferrite and zinc ferrite having oxides in an amount equivalent to approximately 20 mol. per cent of copper oxide, approximately 30 mol. per cent zinc oxide and approximately 50 mol. per cent iron oxide, said core material having a Curie point of approximately 80° C. and an initial magnetic permeability greater than about 1650 at approximately 35° C.

8. A soft ferromagnetic core material consisting essentially of a cubic homogeneous mixed crystal ferrite constituted by magnesium ferrite and zinc ferrite having oxides in an amount equivalent to approximately 25½ mol. per cent of magnesia, approximately 25½ mol. per cent of zinc oxide, and approximately 49 mol. per cent of iron oxide, said core material having a Curie point at approximately 100° C. and having an initial magnetic permeability greater than 670 at a frequency of approximately 2 kilocycles per sec. at the ambient temperature.

9. A soft ferromagnetic core material consisting essentially of a cubic homogeneous mixed crystal ferrite constituted by nickel ferrite and zinc ferrite having oxides in an amount equivalent to approximately 15 mol. per cent of nickel oxide, approximately 35 mol. per cent of zinc oxide, and approximately 50 mol. per cent of iron oxide, said core material having a Curie point at approximately 80° C. and having an initial magnetic permeability greater than about 3000 at a frequency of 2 kilocycles per second at the ambient temperature.

10. A soft ferromagnetic core material consisting essentially of a cubic homogeneous mixed crystal ferrite constituted by a first cubic ferrite having a Curie point greater than 40° and a second cubic ferrite having a Curie point less than about 40° C., said mixed crystal ferrite body having a Curie point between about 40° and 250° C., and having an initial permeability greater than about 600.

11. A soft ferromagnetic core material consisting essentially of a homogeneous mixed crystal ferrite constituted by a first cubic ferrite having a Curie point greater than about 40° and zinc ferrite, said mixed crystal ferrite body having a Curie point between about 40° and 250° C. and having initial permeability greater than about 600.

12. The method of manufacturing a soft ferromagnetic material comprising the steps of mixing a first cubic ferrite having a Curie point greater than 250° C. and a second cubic ferrite having a Curie point less than 250° C. in a ratio to produce a homogeneous mixed crystal ferrite material having a Curie point between about 40° and 250° C., heating said ferrite constituents to a temperature greater than about 1000° C. in an oxidizing atmosphere to form a homogeneous mixed crystal ferrite material having a Curie point between 40° and 250° C., and cooling the mixed crystal ferrite at a rate less than about 10° C. per min. to avoid internal stresses in said mixed crystal ferrite and to preserve said mixed crystal ferrite.

13. The method of manufacturing a soft ferromagnetic material, comprising the steps of mixing a first cubic ferrite having a Curie point greater than about 40° C. and a second cubic ferrite having a Curie point less than about 40°, heating said first and second ferrites in an oxidizing atmosphere, further heating said intermixed ferrites to a temperature greater than about 1000° C. to form a homogeneous mixed crystal ferrite material having a Curie point between about 40° and 250° C. and cooling the mixed crystal ferrite at a temperature rate less than about 10° C. per min. to avoid internal stresses and preserve the mixed crystal ferrite.

14. The method of manufacturing a soft ferromagnetic material, comprising the steps of mixing a bivalent metal oxide and iron oxide constituents forming a first cubic ferrite having a Curie point greater than about 40° C. and zinc oxide and iron oxide constituents forming zinc ferrite, said oxide constituents being in approximately stoichiometric proportions, heating said oxide constituents in an oxidizing atmosphere, and further heating said constituents at a temperature greater than about 1000° C. to form a homogeneous mixed crystal ferrite having a Curie point between 40° and 250° C., and cooling the mixed crystal ferrite at a temperature rate less than about 10° C. per min. to avoid internal stresses and to preserve the mixed crystal ferrite.

15. The method of manufacturing a soft ferromagnetic material, comprising the steps of mixing the substantially pure oxides of copper, zinc, and iron in approximately stoichiometric proportions, sintering the mixture of said oxides in an oxidizing atmosphere at a temperature below 1000° C., pulverizing said sintered oxides to a powdery mass, further sintering said powdery mass at a temperature greater than 1000° C. in an oxygen atmosphere to form a mixed crystal ferrite body having a Curie point between about 40° and 250° C., and cooling the said body at the rate less than about 10° C. per minute to avoid internal stresses in said mixed crystal ferrite body.

16. The method of manufacturing a soft ferromagnetic material, comprising the steps of mixing the substantially pure oxides of copper, zinc, and iron in approximately stoichiometric proportions, sintering the mixture of said oxides in an oxygen atmosphere at a temperature of less than approximately 1000° C., pulverizing said sintered mass of oxides to form a powdery mass, further sintering said powdery mass of oxides at a temperature greater than 1000° C. to form a homogeneous mixed crystal ferrite having a Curie point between about 40° and 250° C., and cooling said body in an oxygen atmosphere at a rate between 5° and 10° C. per min. to avoid internal stresses in said mixed crystal ferrite body and to preserve the mixed crystal structure of said ferrite body.

17. The method of manufacturing a soft ferromagnetic material comprising the steps of mixing the substantially pure oxides of magnesium, zinc, and iron in approximately stoichiometric proportions, sintering said mixture of oxides in an oxygen atmosphere at a temperature of less than 1000°, pulverizing said sintered mixture of oxides to form a powdery mass, further sintering said powdery mass at a temperature greater than about 1000° C. in an oxygen atmosphere to form a mixed crystal ferrite body having a Curie point between about 40° and 250° C., and cooling said mixed crystal ferrite body at a rate less than about 10° C. per minute to avoid forming internal stresses and to preserve said mixed crystal ferrite structure.

18. The method of manufacturing a soft ferromagnetic material, comprising the steps of mixing the pure oxides of nickel, zinc, and iron in approximately stoichiometric proportions, sintering said mixture of oxides in an oxygen atmosphere at a temperature less than about 1000° C., pulverizing said sintered mixture of oxides to a powdery mass, further sintering said powdery mass at a temperature greater than about 1000° in an oxygen atmosphere to form a mixed crystal ferrite body having a Curie point between about 40° and 250° C., and cooling said body at a rate less than about 10° C. per minute to avoid forming internal stresses in said body and to preserve said mixed crystal ferrite structure.

19. The method of manufacturing a soft ferromagnetic material comprising the steps of mixing a first metal oxide and iron oxide forming a first cubic ferrite having a Curie point greater than 250° C. and a second metal oxide and iron oxide forming a second cubic ferrite having a Curie point less than 250° C. in a ratio to produce a homogeneous mixed crystal ferrite material having a Curie point between about 40° and 250° C., heating said ferrite constituents to a temperature greater than about 1000° C. in an oxidizing atmosphere to form a homogeneous mixed crystal ferrite material having a Curie point between 40° and 250° C., and cooling the mixed crystal ferrite at a rate less than about 10° C. per min. to avoid internal stresses in said mixed crystal ferrite and to preserve said mixed crystal ferrite.

JACOB LOUIS SNOEK.

REFERENCES CITED

The following references are of record in the file of this patent:

UNITED STATES PATENTS

| Number | Name | Date |
|---|---|---|
| 1,292,206 | Woodruff | Jan. 21, 1919 |
| 1,946,964 | Cobb | Feb. 13, 1934 |
| 1,976,230 | Kato | Oct. 9, 1934 |

OTHER REFERENCES

Comprehensive Treatise on Inorganic and Theoretical Chemistry, vol. XII, pages 775–777 and 785. J. W. Mellor, Longmans, Green and Co., New York, 1932.